United States Patent [19]

Ostrander et al.

[11] 3,930,409

[45] Jan. 6, 1976

[54] HORSEPOWER COMPUTING NETWORK FOR CHASSIS DYNAMOMETERS

[75] Inventors: Robert F. Ostrander, Orange; James W. Houck, Brookfield, both of Conn.

[73] Assignee: Ostradyne, Inc., Milford, Conn.

[22] Filed: Jan. 28, 1974

[21] Appl. No.: 437,381

[52] U.S. Cl.................................. 73/117; 73/134
[51] Int. Cl.²........................................ G01L 5/13
[58] Field of Search....... 73/117, 136 R, 133 R, 134

[56] References Cited
UNITED STATES PATENTS

| | | |
|---|---|---|
| 2,188,588 | 1/1940 | Antrahikian.................... 324/115 X |
| 2,653,472 | 9/1953 | Gibson............................. 73/133 X |
| 3,289,471 | 12/1966 | Maxwell............................. 73/117 |

*Primary Examiner*—Jerry W. Myracle
*Attorney, Agent, or Firm*—DeLio and Montgomery

[57] ABSTRACT

A vehicle chassis dynamometer for measuring available vehicle road horsepower is disclosed together with means for compensating an apparent dynamometer horsepower reading for dynamometer vehicle rolling resistance, and vehicle drive line losses, and adjusting for ambient barometric pressure, temperature, and fuel specific gravity to obtain an accurate reading of engine flywheel horsepower that may be used directly for comparison with engine manufactures SAE rated horsepower.

12 Claims, 4 Drawing Figures

3,930,409

HORSEPOWER COMPUTING NETWORK FOR CHASSIS DYNAMOMETERS

This invention relates to dynamometers and more particularly relates to vehicle chassis dynamometers for accurately determining the true horsepower available at the drive wheels of a vehicle.

A chassis dynamometer may be generally classified as a shop vehicle testing apparatus for measuring the power available at the drive wheels of a vehicle. The horsepower is determined by measuring the speed of the wheel, generally through a contacting roll, and the torque thereof. Then if electrical signals are derived proportional to each, the horsepower may be calculated by a well known equation and implementing circuitry.

True vehicle wheel or road horsepower is influenced to an appreciable degree by vehicle rolling resistance, drive line efficiency and vehicle weight. All of these factors produce a horsepower loss that must be considered in determining the true engine flywheel net horsepower available. An evaluation of vehicle performance is accomplished by comparison of the horsepower developed by the engine, and the delivered horsepower to the drive wheels.

A given engine will have a rated design horsepower. Some of this horsepower is utilized in accessory demands such as fan, compressor and generator. After subtraction of these losses, a correction should be made for variable factors such as ambient temperature, barometric pressure and fuel specific gravity to determine the horsepower at the flywheel. To further obtain the road horsepower, the drive line efficiency and rolling resistance must be factored in. Obviously, the actual available horsepower for tractive effort and speed appearing at the drive wheels is considerably less than the rated horsepower of the engine.

Engine manufacturers follow Society of Automotive Engineers standards, and refer all ratings to standard conditions which presently include a barometric pressure of 29.0 inches HG, a given fuel specific gravity, and a temperature of 85° F. In any measurement of available horsepower of a vehicle engine, the rated gross engine horsepower must be adjusted for accessory losses, ambient conditions, fuel specific gravity, drive losses and rolling resistances to obtain a true measurement of available horsepower under standard conditions.

Chassis dynamometers are generally used to determine if a vehicle meets its advertised or stated horsepower. With the variables mentioned above, chassis testing is presently largely educated guess work, or values determined by experienced operators.

The present invention provides a new and improved network for use in conjunction with a chassis dynamometer which eliminates guess work and rough compensation factors, and permits a direct readout of vehicle engine net horsepower.

Briefly stated, the present invention provides a means for deriving the indicated horsepower through a conventional speed-torque signal computing network, and further selectively introducing various correction factors for temperature, barometric pressure, and/or fuel specific gravity which depart from the test standards, and also the road losses due to rolling resistance and drive line efficiency which together are termed the K-factor. The present invention also permits selectively including a given loss in a horsepower reading to determine overall efficiency of the vehicle.

An object of this invention is to provide a new and improved vehicle chassis dynamometer.

Another object of this invention is to provide a vehicle chassis dynamometer having the ability to compensate for variable factors which affect measured road horsepower of a vehicle.

A further object of this invention is to provide a new and improved compensation network for use in conjunction with a horsepower computing network to adjust the indicated horsepower signal as a function of one or more of barometer pressure, temperature, fuel specific gravity and vehicle rolling resistance and drive line efficiency.

The features of the invention which are believed to be novel are particularly pointed out and distinctly claimed in the concluding portion of this specification. The invention, however, both as to its organization and operation, together with further objects and advantages thereof, may best be appreciated by reference to the following detailed description taken in conjunction with the drawings, wherein:

Figure 1:
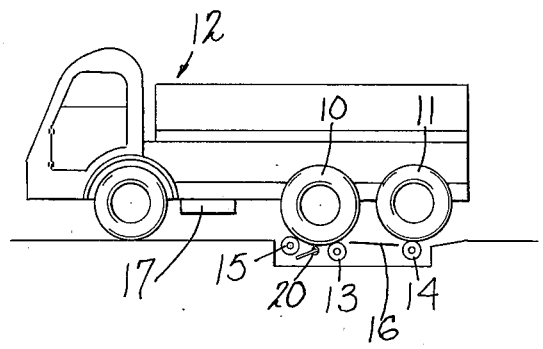
FIG. 1 is a side elevation of a vehicle on a chassis dynamometer.

The invention may be utilized in conjunction with apparatus as shown in co-pending application Ser. No. 313,121 filed Dec. 7, 1972 now U.S. Pat. No. 3,803,909. Such apparatus as exemplified in FIG. 1 comprises rotatable rolls adapted to support and engage the drive wheels 10 and 11 of a vehicle 12. In operation, the vehicle 12 is moved onto the dynamometer rolls so that wheels 10 engage rolls 13 and wheels 11 engage rolls 14. Assuming that only wheels 10 are drive wheels, roll 13 is driven and appropriate readings are taken therefrom for a determination of horsepower output at wheels 13. Roll 15 is positioned to prevent lift-off of the vehicle, and a platform 16 provides a support for the wheels when the vehicle is moved onto the rolls. The vehicle conventionally includes an engine and drive train (not shown) to the drive wheels as well as a fuel tank 17 carrying the fuel with which the vehicle is fueled.

To determine horsepower output at the drive wheels, a power absorption device such as a dynamometer 18 is coupled to roll 13 to measure the torque exerted thereon by wheels 10. The speed of rotation of roll 13 is measured by a tachometer 19 which supplies a voltage proportional to the speed. Tachometer 19 may be driven by an idler 20 in contact with roll 13, or may be driven therefrom in any suitable manner. Idler 20 may also be driven directly by the wheel 10 as exemplified in FIG. 1. The mechanical portions of the testing apparatus may be arranged in various manners to provide signals indicative of speed and torque.

Dynamometer 18 is preferably a Schenck Ul-30 liquid loaded dynamometer having a lever arm 22 which exerts a pressure or movement proportional to roll torque. Such lever arm may work on an air pressure cell (not shown) to produce movement of a potentiometer arm. As shown in simplified form, the lever 22 is adapted to vary the setting of a potentiometer contact arm 23a on its resistance 23. Schenck dynamometers are available from Ostradyne, Incorporated, Milford, Connecticut. Connected in parallel with resistance 23 is the resistance portion 24 of a second potentiometer having a contact arm 24a. A milliammeter 25 calibrated in terms of horsepower is connected between arms 23a and 24a. Resistance 26 serves a calibration and factoring function.

In operation, the potential appearing at arm 24a is proportional to wheel speed. The voltage picked off at arm 23a, which is positioned in response to torque, is a function of torque and speed. The resistances are selected to satisfy the equation Horsepower = RPM × TORQUE/5252

Figure 2:
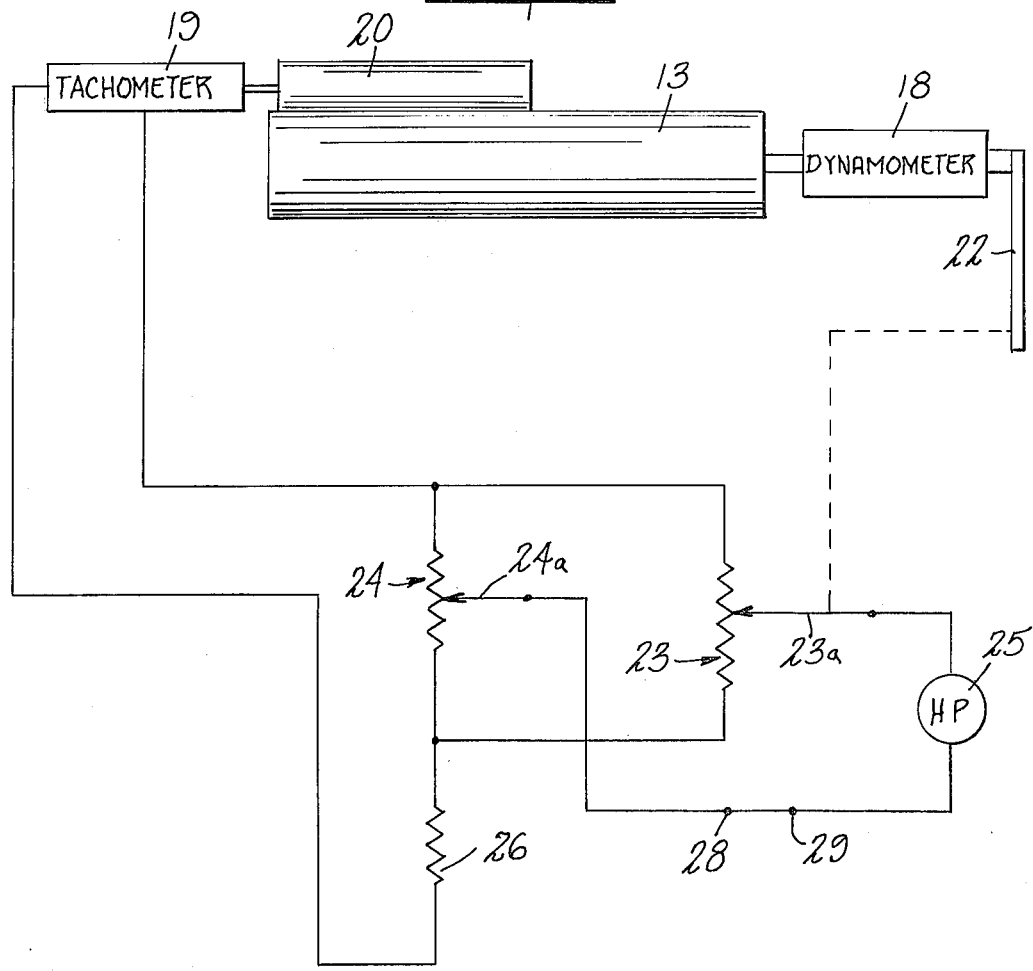
FIG. 2 is a view partly schematic and partly diagrammatic of a horsepower computing network.

As thus far disclosed, the system of FIG. 2 will provide a reading of indicated horsepower at the wheels 10, but without compensation for the variable factors previously discussed.

Figure 3:
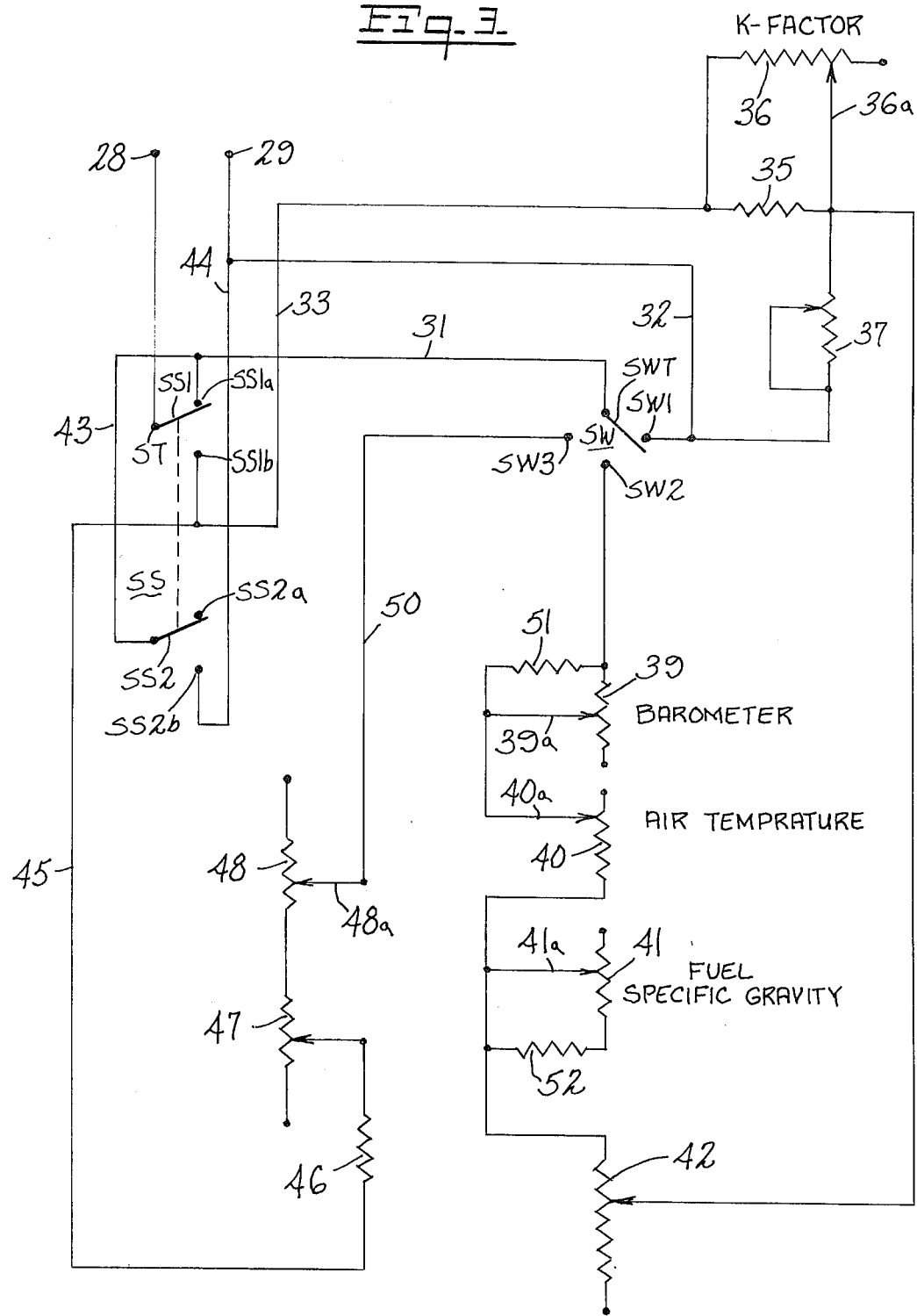
FIG. 3 is a schematic diagram of a network utilized in conjunction with the network of FIG. 2 to accurately determine true drive wheel horsepower of a vehicle.

In accordance with the invention, means are provided to compensate for the aforementioned variables. The connection between points 28 and 29 is opened, and a network as shown in FIG. 3 is provided.

Connected to terminal 28 is the common terminal ST of a plural position selector switch SS having ganged contact arms SS1 and SS2, each adapted to selectively engage contacts SS1a, SS1b and SS2a, SS2b, respectively. Contact SS1a is connected to the common terminal SWT of a second selector switch SW. Switch SW has a plurality of selectable contacts SW1, SW2, and SW3. With switches SS and SW in the positions shown, the network of FIG. 2 is bypassed across terminals 28 and 29 over lines 31 and 32. Meter 25 will thus indicate observed horsepower without variable or rolling resistance losses.

When selector switch SS is set to contacts SS1b, various factors may be introduced to modify the horsepower signal. Assume switch SW is set to contact SW1, a circuit is completed from terminal 28, line 33, through the resistance network including resistance 35, and a shunt variable resistance 36 and trimmer resistance 37 and line 32 to terminal 29. The position of contact arm 36a is set in accordance with the K-factor, hereinafter more fully explained. The resistance network including resistances 35, 36 and 37 are thus inserted in the meter circuit and modify the horsepower signal.

When SS1 is at position SS1b and SW is at position SW2, a circuit is established from point 28, line 33, resistances 35 and 36 (unless 36 is bypassed), variable resistances 39, 40, 41, trimmer resistance 42, line 31, and lines 43 and 44 to point 29.

When selector switch SW is set to contact SW3, a circuit is established from point 28, line 45, resistances 46, 47, and 48, line 50, line 31, and lines 43 and 44 to point 29.

The three networks selected in addition to the bypass condition permit the introduction of selected modifications of the basic horsepower signal appearing between arms 23a and 24a.

The resistance 39 is calibrated in terms of barometric pressure with its midpoint (with respect to contact arm 39a) calibrated to 29.0mm Hg. The resistance 40 is calibrated so that arm 40a is normally at a calibration of 85°F. and may move − 25° and + 42° therefrom. The resistance 41 is selected to have preferably a calibrated range of 33.0 − 41.7, with a standard setting of 35.0. The resistances 51 and 52 are included for calibration purposes. With all of the contact arms 39a, 40a and 41a in their standard positions, the network is set for the SAE standards of 85°F., 29.0mm Hg, and a fuel specific gravity of 35. During a testing operation, if these quantities vary from such standards, the actual conditions are appropriately dialed in by one or more of the arms 39a, 40a and/or 41a.

Figure 4:
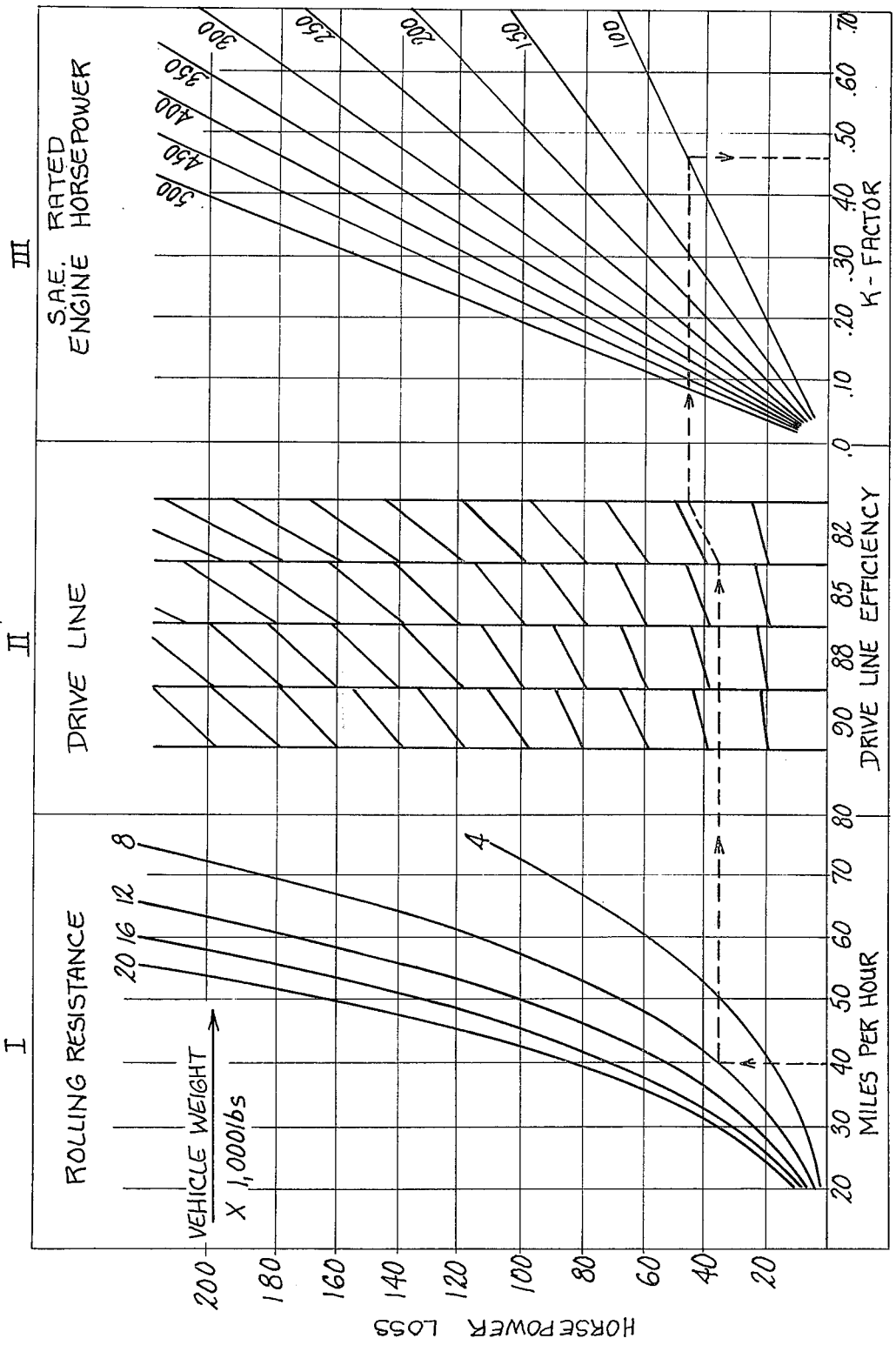
FIG. 4 is a reproduction of a chart which permits compensation for the aforementioned K-factor.

The value of resistance 36 in the circuit is representative of a K-factor, which is a function of vehicle speed and weight, and drive line efficiency. The K-factor may be read from empirical data in chart form as shown in FIG. 4. A first set of curves I is prepared as a function of vehicle speed vs. horsepower loss with vehicle weights as parameter. A second set of curves II is prepared as a function of drive line efficiency versus horsepower losses. The third set of curves III is a plot of horsepower losses due to rolling resistance and drive line versus K-factor with rated engine horsepower as parameter.

The drive line losses referred to are the total of the losses appearing after the fly wheel, such as the gear box, drive shaft, and rear axle losses. These losses, as well as the rolling resistance losses are not corrected for in presently existing dynamometers. In all of curves I–III of FIG. 4, the ordinate units are the same.

Curves I of FIG. 4 are plots showing horsepower rolling resistance loss versus vehicle speed and miles per hour with vehicle weight in thousandths of pounds as parameter. Such curves are empirically determined for given types of chassis dynamometers.

Curves II of FIG. 4 are plots showing the slope of percent drive line horsepower loss over horsepower loss for various drive line efficiencies. Such data is determined from the vehicle manufacturer's stated drive line efficiency calculated to have an ordinant of 1 - efficiency/Horsepower loss Curves III of FIG. 4 are preplotted curves of the total horsepower loss due to rolling resistance and drive line loss as a percentage efficiency for engines of various rated horsepowers where the rated horsepower is determined by the SAE standards at 29.0 inches HG and 85°F. The K-factor as abcissa represents the percent of rated horsepower loss.

In operation of the network of FIG. 3, the overall effect is to vary the signal at meter 25 in accordance with horsepower losses and in accordance with ambient conditions and vehicle parameters. The values of the different resistances selected will depend on the design of the horsepower circuit including primarily the voltage output and current rating of the tachometer, and the current range of the ammeter.

The K-factor represents the percentage loss due to rolling resistance and drive train losses and curves III of FIG. 4 are a plot of K-factor versus such losses with SAE rated engine horsepower as a parameter at barometric reading of 29.0 inches of HG and 85°F. When a vehicle is under test its weight and speed is located on curves I as indicated by the broken line and then such broken line is continued horizontally to the stated efficiency of the drive train, and then drawn parallel to the nearest efficiency loss curve, and then continued along the abscissa to the horsepower curves, and then located on the K-factor abscissa scale. This K-factor is then set on resistance 36 by means of selector arm 36a from a range of 0 through the percent range. As the K-factor increases less resistance 36 is placed in parallel with resistance 35, which will increase the current through milliammeter 25 and change the observed horsepower reading from the dynamometer to a reading corrected for rolling resistance and drive line efficiency.

As the K-factor percentage is dialed in through arm 36a, the current through the milliammeter increases and represents the actual horsepower at the wheels.

It will be noted that the K-factor can be determined for rolling resistance only if the efficiency curves II are not included in the determination of K-factor. This would occur when the broken line is taken directly across from the appropriate speed-horsepower loss durve to the engine horsepower curve.

When switch SS is at contact SS2 and SW is set to contact SW2, the circuit for the variables due to barometric pressure, air temperature and fuel specific gravity are also placed in circuit with resistances 35 and 36 representing the K-factor. At this time the temperature and barometer reading may be checked, and also a hydrometer utilized to take a reading of specific gravity of the fuel. If there is any variation from the standards the contact arms 39a, 40a and 41a are set to the appropriate value to modify the resistance in the circuit and hence the current in milliammeter 25 in accordance with the existing and ambient conditions. For example, if the fuel specific gravity is greater than 35.0 indicating that the engine may be overfueled, the resistance is increased with increase in specific gravity. If the air temperature is less than 85°F., it would indicate more efficient ambient conditions. The amount of the resistance 40 in the circuit is increased and if the barometric pressure is greater than 29.0 the resistance 39 in parallel with resistance 51 would be increased. If the readings were less than the standards mentioned, the selector contact arms 39a, 40a and 41a would be otherwise adjusted. With these adjustments the milliammeter 25 will now accurately indicate the engine net horsepower of the vehicle.

It will be apparent that the ambient parameters and fuel specific gravity may be dialed in as corrections. without the K-factor when switch SW is in position SW2, merely by decreasing the K-factor as represented by the value of resistance 36 in the circuit to 0.

In many tests it is desired only to determine if the vehicle under all conditions has a horsepower output at the wheels which is a given percentage of the rated horsepower for a GO-NO Go test. In this situation, resistance 48 which is calibrated in terms of percent may be, for example, set to 25%, and place 25% of its resistance value in circuit with milliammeter 25 when switch is at contact SW3. If the meter then indicates the rated horsepower of the engine, the vehicle passes the test. Alternatively, resistance 48 may be calibrated in the reverse direction. Assume an engine of 400 rated horsepower is on a vehicle to be tested, and it must pass a specification test of 75% efficiency, then contact arm 48a is set to the 75% mark, and the vehicle brought up to the speed at which the horsepower is rated. The meter 25 will then indicate the actual horsepower at the drive wheels, and if such indicated value is 300 or more, the vehicle has passed the test.

The observed horsepower reading when both selector switches are at position I is the road or wheel horsepower less wind resistance. When the rolling resistance losses as a function of weight and speed are included, the horsepower reading is the true wheel horsepower. When the driveline efficiency factor is included, the horsepower reading is the true horsepower developed at the engine flywheel. This is the net engine horsepower, also referred to as brake horsepower. The inclusion of corrections for deviations of ambient temperature, barometric pressure, and fuel specific gravity then gives a measured vehicle horsepower adjusted to standard conditions.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. In combination with a vehicle dynamometer for measuring the horsepower at the drive wheels thereof where the vehicle includes an engine, drive train to the drive wheels thereof and fuel for the engine, where the indicated horsepower of the engine may be affected by the rolling resistance of the vehicle and one or more of temperature, barometric pressure and vehicle fuel specific gravity, the dynamometer includes means for deriving a signal proportional to drive wheel speed and torque as the vehicle is powered on the dynamometer to give a signal indicative of drive wheel horsepower, and circuit means including an indicating device responsive to said signal for indicating horsepower; the improvement comprising first and second resistance means in circuit with said indicating device, the first of said resistance means calibrated in terms of vehicle rolling resistance, the second of said resistance means calibrated in terms of one of barometric pressure, vehicle fuel specific gravity and ambient temperature, each of said resistances being variable independent of the other whereby the indicated horsepower signal may be selectively modified in accordance with vehicle rolling resistance and one of temperature, barometric pressure and fuel specific gravity.

2. The invention of claim 1 wherein said first resistance is calibrated as a function of vehicle rolling resistance and vehicle speed.

3. The invention of claim 1 wherein said first resistance is calibrated as a function of vehicle rolling resistance and vehicle drive line efficiency.

4. The invention of claim 1 further including third resistance means in said circuit calibrated in terms of percentage of rated horsepower, said third resistance being variable to select a desired percent horsepower.

5. The invention of claim 4 further including switching means whereby said first, second, and third resistances are selectively insertable in circuit with said indicating device.

6. The invention of claim 1 further including switching means whereby said first and said first and second resistances are selectively insertable in circuit with said indicating device.

7. In combination with a vehicle dynamometer for measuring the horsepower at the drive wheels thereof where the vehicle includes an engine, drive train to the drive wheels where the effective horsepower of the engine may be affected by vehicle rolling resistance, the dynamometer includes means for deriving a signal proportional to drive wheel speed and torque as the vehicle is powered on the dynamometer to give a signal indicative of drive wheel horsepower and circuit means including an indicating device responsive to said signal for indicating horsepower; the improvement comprising first variable resistance means calibrated in terms of vehicle rolling resistance, second variable resistance means calibrated in terms of percent of rated horsepower and switching means for selectively placing either of said resistance means in circuit with said indicating device.

8. The invention of claim 7 further including third variable resistance means calibrated in terms of one of barometric pressure, temperature and vehicle fuel specific gravity, and second switching means for selectively placing said third resistance means in circuit with said first resistance means.

9. In combination with a vehicle dynamometer for measuring the horsepower at the drive wheels thereof where the vehicle includes an engine, drive train to the drive wheels thereof and fuel for the engine, where the effective horsepower of the engine may be affected by one or more of barometric pressure, temperature, and vehicle fuel specific gravity, the dynamometer includes means for deriving a signal proportional to drive wheel speed and torque as the vehicle is powered on the dynamometer to give a signal indicative of drive wheel horsepower and circuit means including an indicating device responsive to said signal for indicating horsepower, the improvement comprising first and second resistance means in circuit with said indicating device, said resistances being calibrated in terms of two of barometric pressure, temperature and fuel specific gravity, said resistances being variable independent of the other whereby the indicated horsepower signal may be modified in accordance with one or two of barometric pressure, temperature, and fuel specific gravity.

10. The invention of claim 9 further including third variable resistance means calibrated in terms of vehicle rolling resistance insertable in circuit with said first and second resistance means.

11. The invention of claim 9 further including third resistance means calibrated in terms of percentage of rated horsepower, said third resistance means being variable to select a desired percent horsepower.

12. The invention of claim 11 further including switching means for selectively placing said first and second resistance means, or said third resistance means in circuit with said indicating device.

* * * * *